United States Patent [19]
Pakenham

[11] Patent Number: 5,983,286
[45] Date of Patent: Nov. 9, 1999

[54] METHOD AND APPARATUS FOR SETTING A DEVICE PARAMETER

[75] Inventor: Eugene W. Pakenham, Greeley, Colo.

[73] Assignee: Hewlett-Packard Company, Palo Alto, Calif.

[21] Appl. No.: 08/962,952

[22] Filed: Nov. 6, 1997

[51] Int. Cl.[6] .................................................. G06F 13/00
[52] U.S. Cl. ............................................. 710/9; 710/104
[58] Field of Search ........................... 710/8–14, 62–64, 710/72–74, 104

[56] References Cited

U.S. PATENT DOCUMENTS

| | | | |
|---|---|---|---|
| 4,870,268 | 9/1989 | Vincent et al. | 250/226 |
| 4,926,041 | 5/1990 | Boyd | 250/226 |
| 5,019,703 | 5/1991 | Boyd et al. | 250/208.1 |
| 5,032,004 | 7/1991 | Steinle | 350/171 |
| 5,040,872 | 8/1991 | Steinle | 359/638 |
| 5,044,727 | 9/1991 | Steinle | 350/171 |
| 5,227,620 | 7/1993 | Elder, Jr. et al. | 250/208 |
| 5,317,693 | 5/1994 | Cuenod et al. | 710/9 |
| 5,404,460 | 4/1995 | Thomsen et al. | 710/9 |
| 5,544,333 | 8/1996 | Frazier et al. | 710/124 |
| 5,559,498 | 9/1996 | Westrick et al. | 340/573 |
| 5,577,213 | 11/1996 | Avery et al. | 700/100 |
| 5,610,788 | 3/1997 | Standiford et al. | 360/132 |
| 5,615,345 | 3/1997 | Wanger | 710/129 |
| 5,636,597 | 6/1997 | Van Curen et al. | 119/720 |
| 5,678,065 | 10/1997 | Lee et al. | 710/60 |
| 5,727,184 | 3/1998 | Richter et al. | 710/129 |
| 5,815,734 | 9/1998 | Lee et al. | 710/60 |
| 5,892,929 | 4/1999 | Welker | 710/107 |
| 5,903,778 | 5/1999 | Chang | 710/62 |

OTHER PUBLICATIONS

"Bark Inhibitor" Anti–Bark Training Collar Model BC–50, Innotek Pet Products, Inc. one Innoway, Garrett Indiana 46738 (1–800–826–5527) date unknown.

Primary Examiner—Christopher B. Shin

[57] ABSTRACT

A method and apparatus are disclosed which enable a numeric parameter to be set on an electronic device without the need for a mechanical parameter selecting switch. An existing user interface device, e.g., a button, and an existing user signaling device, e.g., a power light, may be used to set the parameter on a non-volatile memory device which may be provided in association with the electronic device. This allows a parameter, such as an address location, to be set on an electronic device, such as a computer peripheral device, without the need for a mechanical parameter selecting switch.

28 Claims, 5 Drawing Sheets

METHOD AND APPARATUS FOR SETTING A DEVICE PARAMETER

FIELD OF THE INVENTION

The present invention relates generally to a method and apparatus for setting a parameter and, more particularly, to a method and apparatus for setting a parameter on an electronic device.

BACKGROUND OF THE INVENTION

In the operation of electronic devices, it is often required that various parameters be set on the devices in order to enable proper function of the devices. Examples of such electronic devices include computer peripheral devices, such as scanners, tape drive units, external hard drive units, etc. It is common to string such peripheral devices together in a serial relationship in what is commonly referred to as a "daisy chain" arrangement. When computer peripheral devices are arranged in such a daisy chain arrangement, it is necessary to assign a unique address to each peripheral device in the chain so that the computer can selectively interact with a particular device in the chain at any given time. Such addresses typically consist of a number from zero through seven. Thus, a tape drive unit in a daisy chain may, for example, be assigned an address equal to 1, a scanner may be assigned an address equal to 2 and so on.

As can be appreciated from the above, when a new peripheral device is added to a daisy chain, its address must first be set to a value which is not being used by any of the other devices in the chain. To facilitate setting of the address, most peripheral devices include a mechanical switch which can be physically moved to select the appropriate address number.

FIG. 2 illustrates a rear panel 40 of a typical computer peripheral device, e.g., a scanner. Such a rear panel commonly includes a connection board 50 to facilitate attachment of the peripheral device to the a computer and to other devices in a daisy chain arrangement. Specifically, the connection board 50 may include a first port 52 and a second port 56. First port 52 may be provided to allow the peripheral device to attach to a computer (either directly, or indirectly through another peripheral device) and may be adapted to attach to an interface cable, such as a typical SCSI interface cable, in a conventional manner.

In a similar manner to the first port 52, second port 56 may be adapted to attach with a typical SCSI cable. Second port 52, however, may be provided to connect the peripheral device to other "downstream" peripheral devices in the daisy chain.

Rear panel 50 may also include a mechanical address setting switch 60. The address setting switch 60 may include a slot 62 in order to facilitate turning of the switch 60 with an appropriate tool, such as a small screw driver. In this manner, the address setting switch may be turned in order to select the desired address, zero through seven.

It is noted that the address setting switch 60 is illustrated as a rotary switch in FIG. 2 for exemplary purposes only. Other types of mechanical address setting switches, such as slide switches and push button switches, are also commonly used in peripheral devices.

Examples of computer peripheral devices are disclosed in the following U.S. Pat. No. 4,870,268 of Vincent et al. for COLOR COMBINER AND SEPARATOR AND IMPLEMENTATIONS; U.S. Pat. No. 4,926,041 of Boyd for OPTICAL SCANNER; U.S. Pat. No. 5,019,703 of Boyd et al. for OPTICAL SCANNER WITH MIRROR MOUNTED OCCLUDING APERTURE OR FILTER; U.S. Pat. No. 5,032,004 of Steinle for BEAM SPLITTER APPARATUS WITH ADJUSTABLE IMAGE FOCUS AND REGISTRATION; U.S. Pat. No. 5,044,727 of Steinle for BEAM SPLITTER/COMBINER APPARATUS; U.S. Pat. No. 5,040,872 of Steinle for BEAM SPLITTER/COMBINER WITH PATH LENGTH COMPENSATOR; U.S. Pat. No. 5,227,620 of Elder, Jr. et al. for APPARATUS FOR ASSEMBLING COLOR OPTICAL COMPONENTS OF COLOR OPTICAL SCANNERS, and U.S. Pat. No. 5,610,788 of Standiford et al. for MEDIA CONTAINING CARTRIDGE AND DRIVE THEREFOR EMPLOYING MULTIPLE REGISTRATION POINTS, which are all hereby specifically incorporated by reference for all that is disclosed therein.

Over the years, the cost of computer peripheral devices, in general, has decreased. In light of this decreasing cost trend, computer peripheral manufacturers constantly strive to find ways to manufacture peripheral devices in a more economical manner. One problem with a mechanical address setting switch, such as the rotary address setting switch 60 described above, is that this type of switch tends to be relatively expensive. It would, thus be desirable to replace the conventional mechanical address setting switch of a peripheral device with a less expensive alternative.

Another problem with mechanical address setting switches, such as the rotary address switch 60 described above, is that they tend to be difficult to access. As explained above, most physical address setting switches are located on the same board 50, FIG. 2, as the interface ports 52 and 56. This generally necessitates that the mechanical address setting switch be located on the rear panel of a peripheral device, since this is where the board 50 is generally located. In operation, a typical peripheral device is often located with its rear panel against or near a wall, such that the rear panel is inaccessible. Accordingly, in order to adjust a mechanical address setting switch located on the rear panel of a peripheral device, the device often must first be moved from its operating location in order to provide access to the rear panel of the device. This situation presents an inconvenience for the operator of the peripheral device when it is necessary to adjust the mechanical address setting switch.

Another problem with a typical mechanical address setting switch is that adjustment often requires special tools. As described above, in order to adjust the rotary address setting switch 60, for example, a small screw driver is required. This necessity for special tools is a disadvantage associated with most mechanical address setting switches.

It is noted that there are applications other than computer peripheral devices in which the use of a mechanical parameter selecting device is simply not practical. One example of such an application is a parameter selection device for a disabled person, in particular a person who has little or no use of his or her hands. Such a person may find it difficult or impossible to select a parameter (such as computer input or operating instructions associated with a powered wheelchair) using a conventional mechanical parameter selecting switch. Another example of such an application is a parameter selection device for a fighter pilot. A fighter pilot may have his or her hands occupied flying an aircraft and, thus, be unable to effectively operate a typical mechanical parameter selection device, such as a weapons system selector switch.

Accordingly, it would be desirable to provide a parameter setting mechanism which overcomes the problems associated with mechanical parameter setting switches, as described above.

SUMMARY OF THE INVENTION

The present invention is directed to a method and apparatus which allow a parameter to be set on an electronic device without the need for a mechanical parameter selecting switch. According to the method, a user interface device, which may be, for example, an existing button or switch on the electronic device, is activated by a user until the electronic device enters a parameter setting mode. A user signaling device, which may be, for example, an existing light on the electronic device, then switches to an off position, indicating that the parameter setting mode has been entered.

After the parameter setting mode has been entered, the user signaling device is then cycled on and off repeatedly. The user then deactivates the user interface device after the user signaling device has cycled on a number of times equal to the desired value for the parameter. After the user has released the interface device, the selected value is stored in a non-volatile memory device, and thus becomes the new default value for the parameter.

This method allows a parameter, such as an address location, to be set on an electronic device, such as a computer peripheral device, without the need for a mechanical selector switch. The code for performing the method may be stored on a PROM device for execution by a conventional micro-controller. Both the PROM device and the micro-controller may represent components already existing in the electronic device.

DETAILED DESCRIPTION OF THE INVENTION

Figure 1:
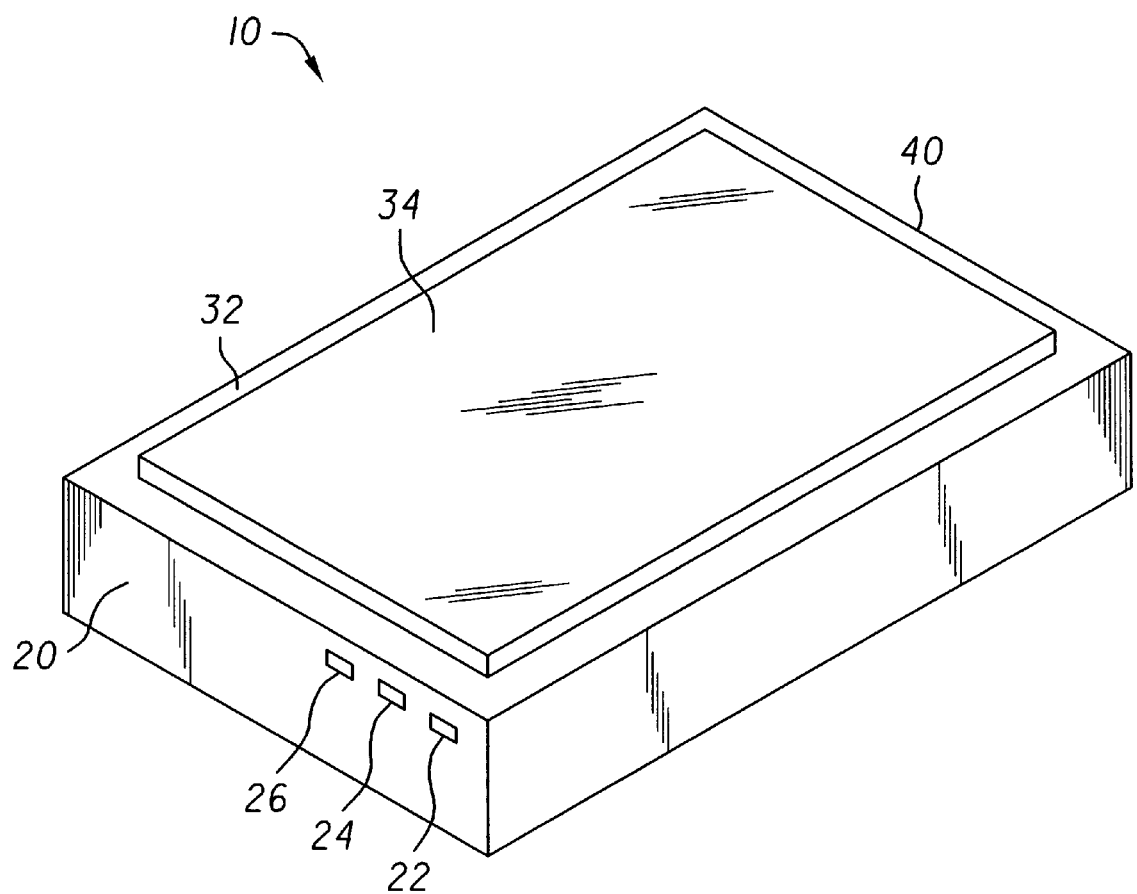
FIG. 1 is a top perspective view of a computer peripheral device.

FIGS. 1–5 in general, illustrate a method for setting an address for a computer peripheral device 10. The method includes the steps of entering an address setting mode when a user activates a user interface mechanism 26 associated with the peripheral device 10 for a first predetermined length of time; after the first predetermined length of time has passed, cycling a user signaling device 24 associated with the peripheral device 10 by switching the user signaling device 24 to a first condition and then switching the user signaling device 24 to a second condition which is distinguishable from the first condition; stopping the cycling when the user deactivates the user interface mechanism 26; and setting the address according to the number of cycles which occurred before the cycling was stopped.

FIGS. 1–5 also illustrate, in general, a method for setting a parameter on a device 10. The method includes the steps of entering a parameter setting mode when a user activates a user interface mechanism 26 for a first predetermined length of time; switching to a first condition a user signaling device 24 when the parameter setting mode has been entered and maintaining the user signaling device 24 in the first condition for a second predetermined length of time; after the second predetermined length of time has passed, cycling the user signaling device 24 by switching the user signaling device 24 to a second condition for a third predetermined length of time and switching the user signaling device 24 to the first condition for a fourth predetermined length of time; stopping the cycling when the user releases the user interface mechanism 26; and setting the parameter according to the number of cycles which occurred before the cycling was stopped.

FIGS. 1–5 also illustrate, in general, a computer peripheral apparatus 10 which includes storage means 100 for storing a numerical parameter; signaling means 24 for signaling a user of the computer peripheral apparatus; interface means 26 for allowing the user to provide input to the computer peripheral apparatus 10; means 70 for cycling the signaling means 24 between a first user apparent condition and a second user apparent condition for a number of cycles until the user provides input with the interface means 26; and setting means 70 for setting the value of the numerical parameter on the storage means 100 based upon the number of cycles.

Having thus described the parameter setting method and apparatus in general, the method and apparatus will now be described in further detail.

FIG. 1 illustrates a computer peripheral device which, in this case, may be a scanner 10. The scanner 10 may, in a conventional manner, include a front panel 20, and an oppositely dispose rear panel 40. An upper, generally horizontal surface 32 may extend between the front and rear panels 20, 40. A lid 34 may be hingedly attached to the upper surface 32 in order to protectively cover a glass scanning platen, not shown, in a conventional manner.

Front panel 20 may include various user interface features such as a power switch 22, a power light 24 and a scan button 24. The power switch 22 may be used, in a conventional manner, to toggle the scanner 10 between a powered on and a powered off condition. The power light 24 indicates, i.e., is illuminated, when the scanner 10 is in the powered on condition. The scan button 26 may be used, in a conventional manner, to allow a user to initiate a scan by the scanner 10.

Figure 2:
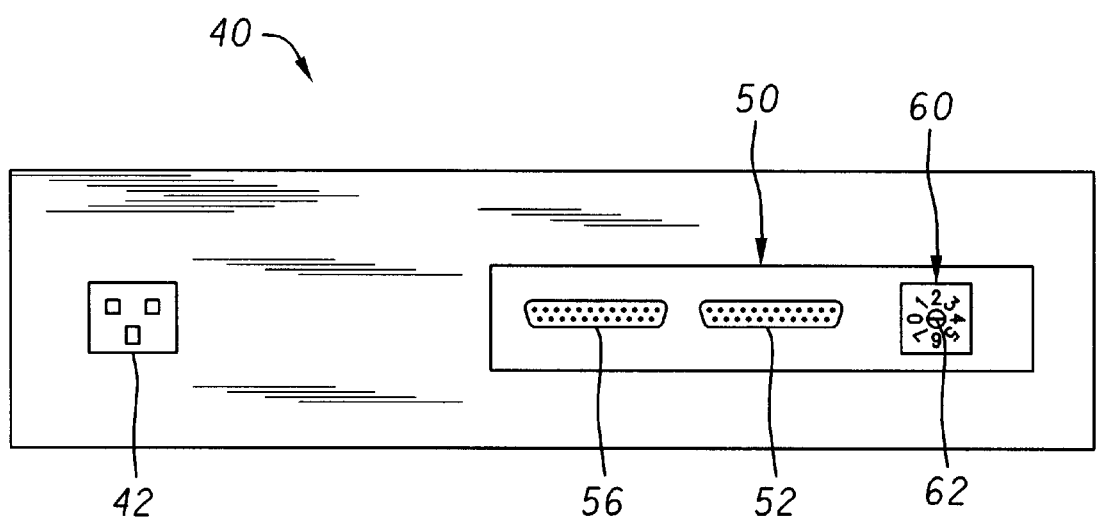
FIG. 2 is a rear elevation view of a computer peripheral device.

FIG. 2 illustrates the scanner rear panel 40 in further detail. As can be seen from FIG. 2, rear panel 40 may include a typical power connector 42 to facilitate connecting a power cord, not shown, to the scanner 10 in a conventional manner. Rear panel 40 may further include a connection board 50 to facilitate attachment of the scanner 10 to a computer and to other devices in a daisy chain arrangement, as previously described in the Background section of this patent. Specifically, the connection board 50 may include a first port 52 and a second port 56. First port 52 may be provided to allow the scanner 10 to attach to a computer (either directly, or indirectly through another peripheral device) and may be adapted to attach to an interface cable, such as a typical SCSI interface cable, in a conventional manner.

In a similar manner to the first port 52, second port 56 may be adapted to attach with a typical SCSI cable. Second port 52, however, may be provided to connect the scanner 10 to other "downstream" peripheral devices in the daisy chain.

Connection board 50 may also include a mechanical address setting switch 60. The address setting switch 60 may include a slot 62 in order to facilitate turning of the switch 60 with an appropriate tool, such as a small screw driver. In this manner, the address setting switch may be turned in order to select the desired address, zero through seven.

It is noted that the address setting switch 60 is illustrated as a rotary switch in FIG. 2 for exemplary purposes only. As described previously, other types of mechanical address setting switches are also commonly used.

Figure 3:
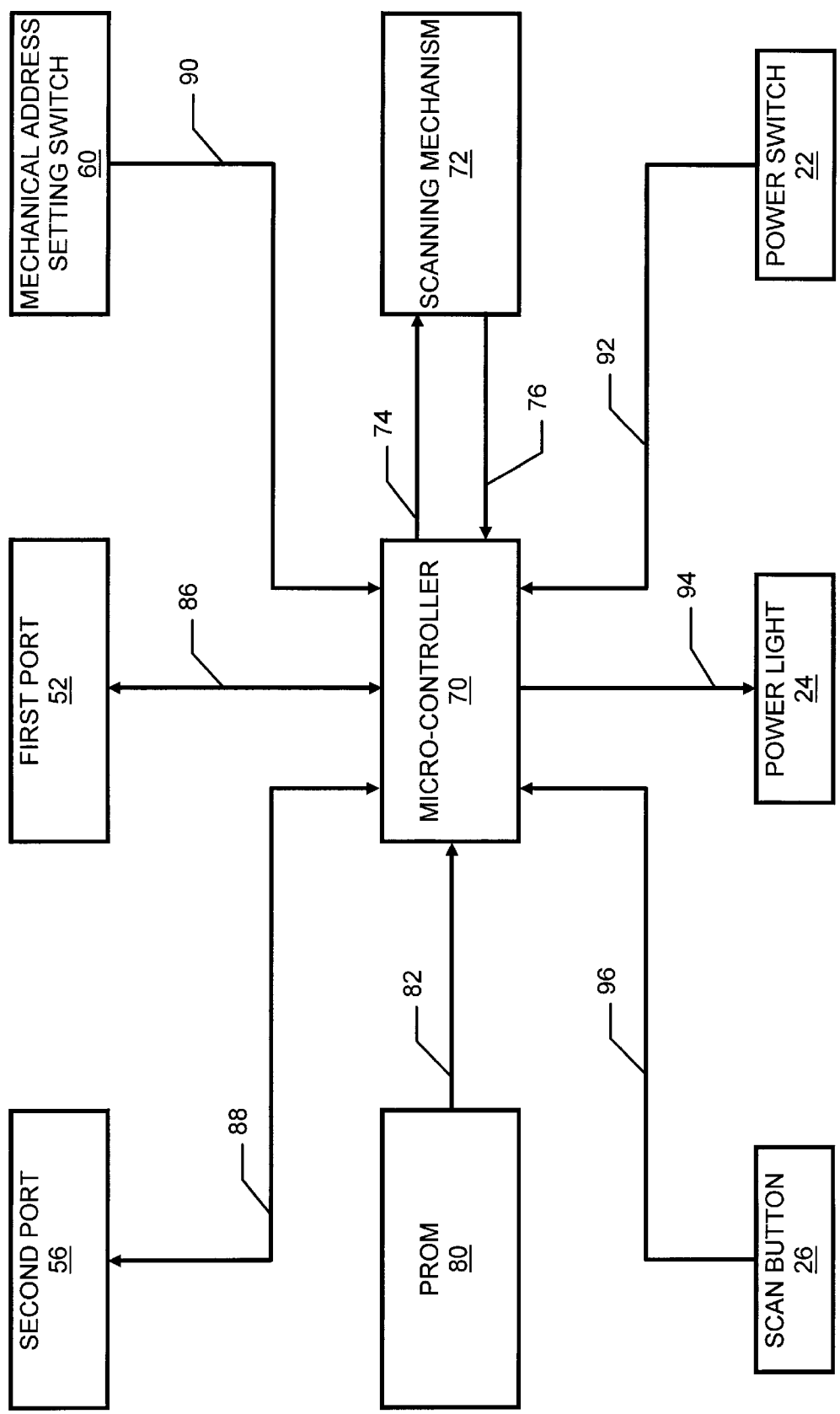
FIG. 3 is a schematic diagram illustrating the operating components of a computer peripheral device.

FIG. 3 is a schematic illustration of the conventional operating components of the scanner 10. A micro-controller 70 may be provided, as shown, in order to control the operation of the scanner 10. Micro-controller 70 may be a conventional eight bit microprocessor such as a Motorola Model No. 68HC11. A scanning mechanism is schematically illustrated in FIG. 3, as indicated by reference numeral 72. The scanning mechanism 72 may, for example, include a motor driven scan head assembly upon which optical components and a linear photosensor array may be mounted in a conventional manner as generally described, for example in U.S. Pat. Nos. 4,8700,268; 4,926,041; 5,019,703; 5,032,004; 5,044,727; 5,040,872; and 5,277,620, as previously referenced.

Micro-controller 70 sends signals to the scanning mechanism 72 of the scanner 10 via a data connection 74. Micro-controller 70, thus, is able to control the operation of the scanning mechanism 72 in a conventional manner. When micro-controller 70 causes the scanning mechanism 72 to initiate a scan, data collected during the scanning process may be sent back to the micro-controller 70 via a data connection 76 in a conventional manner.

Referring again to FIG. 3, it can be seen that the scanner 10 may also include a programable read only memory device 80 which may also be referred to herein as a "PROM". Programable read only memory device 80 may comprise a conventional PROM device such as an industry standard 27C010 PROM device sold, for example, by Texas Instruments. Such a PROM device may, in a well known manner, be programmed once to include desired program code. After being programed, the PROM may be connected to the micro-controller 70 via the connection 82, as shown in FIG. 3, so that the micro-controller 70 is able to execute the code stored on the PROM. In this manner, the micro-controller 70 is able to control the operation of the scanner 10 according to the code stored on the PROM 80.

Referring again to FIG. 3, a two-way data connection 86 may be provided between the first port 52 and the micro-controller 70 in order to allow data acquired by the scanning mechanism 72 during a scan to be transmitted to a computer connected to the first port 52 via an appropriate cable connector, not shown. The connection 86 also allows the computer to send signals to the micro-controller 70.

A two-way data connection 88 may also be provided between the second port 56 and the micro-controller 70 in order to allow the computer attached to first port 52 to communicate with downstream peripheral devices in a "daisy chain" arrangement which may be connected to the second port 56.

Power switch 22 may be connected to the micro-controller 70 via a connection 92 such that activation of the power switch 22 by a user will cause the scanner to be powered on. The power light 24 may be connected to the micro-controller 70 via a connection 94 so that the micro-controller 70 may cause the power light 24 to illuminate, thus providing the user with a visual signal indicating that the scanner power is on.

Scan button 26 may be connected to micro-controller 70 via a connection 96 so that a user may activate the scan button 26 in order to cause the scanner 10 to initiate a scanning operation. Specifically, when the micro-controller 70 detects that the scan button 26 has been depressed, it will then activate the scanning mechanism 72 to initiate the scan in a conventional manner.

Referring again to FIG. 3, the mechanical address setting switch 60, as previously described, may be connected to the micro-controller 70 via a connection 90 as shown. In this manner, the value of the address set on the switch 60 may be transmitted to the micro-controller 70 via the connection 90. Accordingly, the micro-controller 70 knows the address assigned to the scanner 10 and, thus, the computer attached to the scanner 10 may selectively communicate with the scanner 10 in a manner as previously described.

It would be desirable to eliminate the need for mechanical address setting switches, such as the mechanical switch 60 described above, in peripheral devices, such as the scanner 10. As previously described, such mechanical address setting switches are generally undesirable because, for example, they are relatively expensive, they require special tools to operate, and because they are generally located on the rear panel of peripheral devices such that accessability to the switches is compromised.

Figure 4:
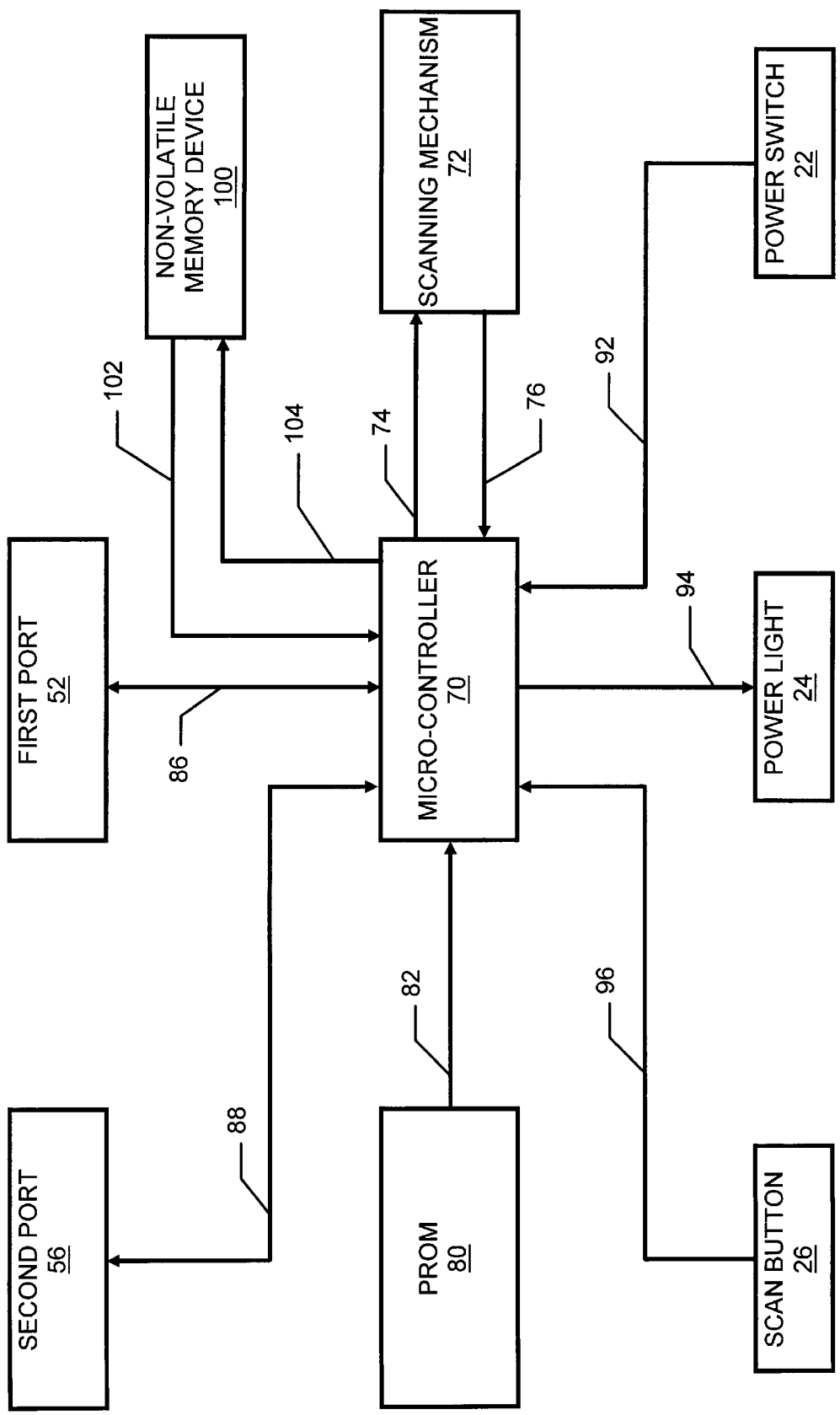
FIG. 4 is a schematic diagram illustrating modified components of the peripheral device of FIG. 3.
Figure 5:
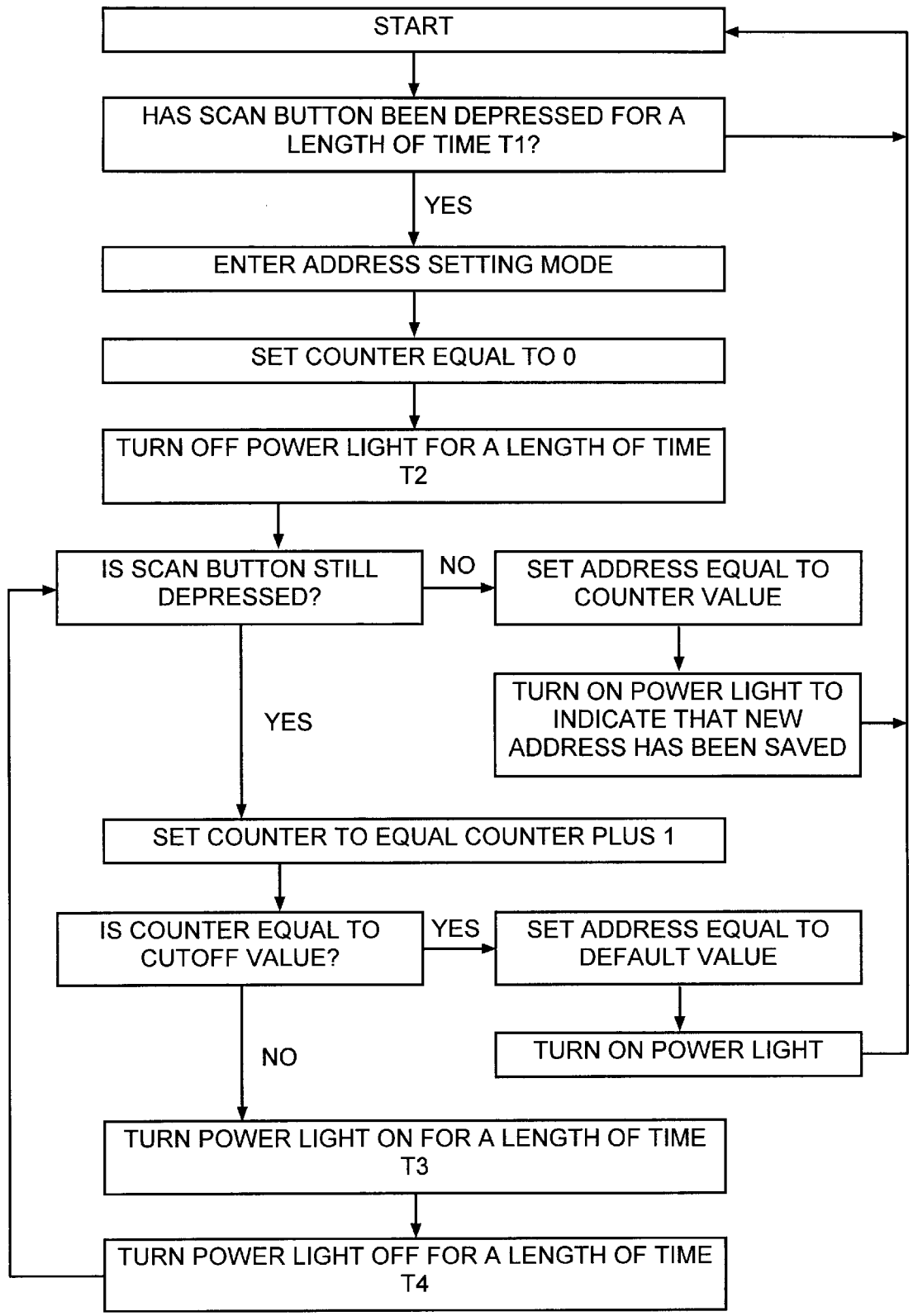
FIG. 5 is a flow chart illustrating the present method.

FIG. 4 is a schematic illustration of the operating components of the scanner 10 in which the mechanical address setting switch 60 has been eliminated. As can readily be seen, FIG. 4 is substantially identical to FIG. 3 except that the mechanical address setting switch 60 has been removed and a non-volatile memory device 100 has been substituted therefor. Specifically, the non-volatile memory device 100 may be connected to micro-controller 70 via a fist connection 102 and a second connection 104. Non-volatile memory device 100 may comprise a conventional non-volatile memory device such as an industry standard 24C02A non-volatile memory device sold, for example, by Texas Instruments.

This type of memory device is commonly referred to as a "non-volatile" device because it is capable of storing information even when no power is supplied to it. Accordingly, since the non-volatile memory device is capable of "remembering" an address even while power to the scanner is turned off, it may be used to store the address value for the scanner 10. The address value may be entered on the non-volatile memory device using user interface features already existing on the scanner 10. In order to accomplish this, the PROM 80 may be programmed to incorporate the methodology described below.

A method allowing a user to enter or change the address stored on the non-volatile memory device 100 will now be described in detail. First, the user powers on the scanner 10 (if it is not already powered on) using the power switch 22. Next, the user depresses and holds the scan button 26. When the micro-controller 70 senses that the scan button has been depressed for a predetermined length of time "T1" which may be, for example, about ten seconds, the micro-controller enters an address setting mode.

When the address setting mode has been activated in the manner described above, the micro-controller 70 causes the power light 24 to turn off for a predetermined length of time "T2" which may be, for example, about two seconds, thus indicating to the user that the address setting mode has been activated. After the power light has been off for the length of time "T2", the micro-controller begins an input cycle in which the power light 24 is repetitively turned on and off.

Specifically, during the input cycle, the power light 24 may be turned on for a length of time "T3" which may, for example, be about 0.5 seconds and then off for a length of time "T4" which may, for example, be about 1.5 seconds. In order to set the address value, the user observes the cycling power light and releases the scan button 26 after the power light has cycled on a number of times equal to the desired address. After the user releases the scan button 26, the micro-controller 70 sends an address value to the non-volatile memory device 100, via the data connection 104, which is equal to the number of times that the power light 24 has cycled to the on condition. The micro-controller 70 then turns the power light 24 back on confirming to the user that the new value has been saved as the new address on the non-volatile memory device 100.

If the user has not released the scan button after a predetermined "cutoff value" number of cycles then it is assumed that the user does not understand the address setting mechanism or has decided not to change the is address. Accordingly, if the cutoff value is reached without the scan button being released, then the address is set to equal a default value which may, for example, be equal to two. Alternatively, the address may be reset to the original address setting if the cutoff value is reached without the scan button being released. The cutoff value may, for example, be eight since, in most practical applications, valid device addresses range from zero to seven.

After the new address has been stored on the non-volatile memory device 100, the value of this address may later be communicated to the micro-controller 70 via the data connection 102. In this manner, the computer connected to the scanner 10 is able to identify the scanner 10 by its new address.

The methodology described above is illustrated in flow-chart format in FIG. 5. Specific code to carry out this methodology may be added to the PROM in a conventional manner such that the micro-controller 70 can execute the steps as described above.

The address setting method can generally be carried out at any time that the scanner is idle, i.e., not performing a scanning operation. As can be appreciated, the addition of the non-volatile memory device 100, in combination with the method described above, allows the address for a peripheral device, such as the scanner 10, to easily be set without the need for a mechanical address setting switch.

It is noted that non-volatile memory devices, such as the specific non-volatile memory device 100 described herein, are generally significantly less expensive than mechanical address setting switches. Accordingly, the use of a non-volatile memory device, as described above, saves considerable cost when compared to a mechanical address setting switch. The use of a non-volatile memory device also overcomes other disadvantages associated with mechanical address setting switches as described previously.

It is noted that a typical non-volatile memory device, such as the device 100 described herein, may generally be capable of storing up to, e.g., 120 bytes of information. Since only one byte is generally required to store the address setting, a significant amount of memory remains unused and, thus, may be used to store additional information. The non-volatile memory device 100 may, for example, be used to store additional information such as the date of manufacture and a serial number for the scanner 10.

It is noted that, although a schematic for a scanning device is illustrated in FIGS. 3 and 4, many computer peripheral devices operate in a similar manner, i.e., one in which a micro-controller executes program code stored on a PROM device. Accordingly, the method described above could easily be used in conjunction with such peripheral devices. As can be appreciated, however, even peripheral devices that operate in a different manner than that described above could readily be adapted to benefit from the method described herein.

As can further readily be appreciated, the above methodology may be used with electronic devices other than computer peripheral devices. So long as at least one user interface mechanism (e.g., a button) and at least one user signaling device (e.g., a light) are present, the method described above may be used to select and set a parameter without the need for a mechanical selector switch. Examples of such electronic devices include various household appliances, e.g., toasters, thermostats, coffee makers, etc., in which it may be desirable to set a parameter, e.g., temperature" without the need for a relatively expensive mechanical selector switch and/or a display panel.

Another example of an application for the methodology disclosed above is a wheelchair control system for a disabled person who may have limited or no use of his or her hands. Such a system might, for example, include a single large actuator button and an indicator light. The disabled person could use the button and light, according to the method previously described, in order to select various functions for the wheelchair. As can be appreciated, activating a single large actuator button would be significantly easier than manipulating a manual selector switch, e.g., a rotary selector switch, when selecting a parameter or function, particularly for a person having limited or no use of his or her hands.

Another application for the method described herein is for a fighter jet pilot control system, e.g., a weapon selection system. In such a system, a pilot could select the desired parameter, e.g., the type of weapon to be activated, using only a single button and a single visual indicator, e.g., a flashing light. In this manner, the pilot could quickly select a weapon without the need to manipulate a mechanical selector switch, e.g., a rotary selector switch.

Referring again to FIG. 4, the address stored on the non-volatile memory device 100 may also be used to identify a diagnostic mode for the scanner 10. The scanner 10 may be placed into a diagnostic mode in a manner as will now be described in detail. First, with the scanner powered off, the scan button is depressed. Then, while the scan button is held down, the scanner power switch 22 is switched to the on position. The PROM 80 may be programmed such that the preceding steps cause the scanner 10 to power up in a diagnostic mode. The particular diagnostic test that will be performed by the micro-controller 70 depends upon the address set on the non-volatile memory device 100.

If, for example, the address is set to equal "zero" when the diagnostics mode is initiated, then the micro-controller might initiate a diagnostic test in which the scanner LED is tested. If the address is set to equal "one" when the diagnostics mode is initiated, then the movement of the scanning carriage may be tested, and so on. Accordingly, the address value set on the non-volatile memory device may be used to dictate a diagnostic mode as well as the device address.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method for setting an address for a computer peripheral device, said method comprising:

entering an address setting mode when a user activates a user interface mechanism associated with said peripheral device for a first predetermined length of time;

after said first predetermined length of time has passed, cycling a user signaling device associated with said peripheral device as follows:

switching said user signaling device to a first condition;
switching said user signaling device to a second condition which is distinguishable from said first condition;
stopping said cycling when said user de-activates said user interface mechanism;
setting said address according to the number of cycles which occurred before said cycling was stopped.

2. The method of claim 1 wherein said step of setting said address comprises:
setting said address according to the number of times that said user signaling device was switched to said second condition during said cycling.

3. The method of claim 1 wherein said step of setting said address comprises:
setting said address to equal the number of times that said user signaling device was switched to said second condition during said cycling.

4. The method of claim 1 including the further steps of:
stopping said cycling after a predetermined number of cycles if said user has not de-activated said user interface mechanism after a predetermined number of cycles; and
setting said address to a default value.

5. The method of claim 1 wherein said user interface mechanism comprises a button.

6. The method of claim 5 wherein said button also serves as a power button for said peripheral device.

7. The method of claim 1 wherein said user signaling device comprises a light.

8. The method of claim 7 wherein said light also serves as a power light for said peripheral device.

9. The method of claim 7 wherein said first condition is a condition in which said light is off and said second condition is a condition in which said light is on.

10. The method of claim 1 wherein said step of setting said address comprises storing said address on a non-volatile memory device.

11. A method for setting a parameter on a device, said method comprising:
entering a parameter setting mode when a user activates a user interface mechanism for a first predetermined length of time;
switching to a first condition a user signaling device when said parameter setting mode has been entered and maintaining said user signaling device in said first condition for a second predetermined length of time;
after said second predetermined length of time has passed, cycling said user signaling device as follows:
switching said user signaling device to a second condition for a third predetermined length of time;
switching said user signaling device to said first condition for a fourth predetermined length of time;
stopping said cycling when said user releases said user interface mechanism;
setting said parameter according to the number of cycles which occurred before said cycling was stopped.

12. The method of claim 11 wherein said step of setting said parameter comprises:
setting said parameter according to the number of times that said user signaling device was switched to said second condition during said cycling.

13. The method of claim 11 wherein said step of setting said parameter comprises:
setting said parameter to equal the number of times that said user signaling device was switched to said second condition during said cycling.

14. The method of claim 11 including the further steps of:
stopping said cycling after a predetermined number of cycles if said user has not de-activated said user interface mechanism after a predetermined number of cycles; and
setting said parameter to a default value.

15. The method of claim 11 wherein said user interface mechanism comprises a button.

16. The method of claim 15 wherein said button also serves as a power button for said device.

17. The method of claim 11 wherein said user signaling device comprises a light.

18. The method of claim 17 wherein said light also serves as a power light for said device.

19. The method of claim 17 wherein said first condition is a condition in which said light is off and said second condition is a condition in which said light is on.

20. The method of claim 11 wherein said step of setting said parameter comprises storing said parameter on a non-volatile memory device.

21. A computer peripheral apparatus comprising:
storage means for storing a numerical parameter;
signaling means for signaling a user of said computer peripheral apparatus;
interface means for allowing said user to provide input to said computer peripheral apparatus;
means for cycling said signaling means between a first user apparent condition and a second user apparent condition for a number of cycles until said user provides input with said interface means;
setting means for setting the value of said numerical parameter on said storage means based upon said number of cycles.

22. The computer peripheral apparatus of claim 21 wherein said setting means comprises means for setting said the value of said numerical parameter to be equal to said number of cycles.

23. The computer peripheral apparatus of claim 21 and further comprising:
means for stopping said cycling after a predetermined number of cycles if said user has not provided input with said interface means and for setting said numerical parameter to a default value.

24. The computer peripheral apparatus of claim 21, wherein said interface means comprises a button.

25. The computer peripheral apparatus of claim 24 wherein said button also serves as a power button for said computer peripheral apparatus.

26. The computer peripheral apparatus of claim 21 wherein said signaling means comprises a light.

27. The computer peripheral apparatus of claim 26 wherein said light also serves as a power light for said computer peripheral apparatus.

28. The computer peripheral apparatus of claim 21 wherein said storage means comprises a non-volatile memory device.

* * * * *